March 12, 1957 J. W. DUGAN 2,784,530
METHOD FOR MIXING AMMONIA WITH WATER AND
INTRODUCING THE MIXTURE INTO THE SOIL
Filed Oct. 31, 1952

John Warren Dugan
INVENTOR.

BY *[signatures]*
Attorneys

United States Patent Office 2,784,530
Patented Mar. 12, 1957

2,784,530

METHOD FOR MIXING AMMONIA WITH WATER AND INTRODUCING THE MIXTURE INTO THE SOIL

John Warren Dugan, Houma, La., assignor to Flo-Mix Fertilizers Corporation, Houma, La., a corporation of Delaware Application October 31, 1952, Serial No. 318,063

9 Claims. (Cl. 47—58)

The present invention relates to a method for supplying soil with nitrogen.

At present, there are generally two methods of direct fixed nitrogen fertilization of soil. One method consists of treating the soil with aqua ammonia and the other consists of treating the soil with fluid anhydrous ammonia.

In the first method mentioned above, the commercially produced aqua ammonia is used, which at standard conditions is saturated upon a concentration of 28% by weight of ammonia. This method is not completely efficient since by virtue of the fixed ammonia content, the solution cannot be varied for different soil conditions. Thus, there is no means for increasing the strength of the ammonia in solution to compensate for changing moisture conditions in the soil wherein the soil could absorb more nitrogen than that available in the solution without danger of burning the sod or vegetation. Also, the storage, transportation and distribution of aqua ammonia is considerably more expensive than if an equal quantity of nitrogen were added to the soil by the use of anhydrous ammonia.

When applying the anhydrous ammonia to the soil, especially in pasture fertilization or other shallow applications, although the amount of ammonia may be varied, there is often insufficient moisture in the soil to absorb the ammonia or insufficient cover permitting the free ammonia to escape. In either case, the sod is burned by the escaping ammonia. Or, should the quantity of ammonia be small enough to prevent the escape of free ammonia and the consequent burning of the sod, it may be insufficient for proper fertilization.

Therefore, it is a primary object of the present invention to provide a method of supplying fixed nitrogen to soil wherein the quantity of fixed nitrogen available from ammonia application may be varied within wide limits and wherein the danger of burning the sod is eliminated.

Another important object of the invention is to extend the economy and efficiency of supplying fixed nitrogen to soil by the use of anhydrous ammonia to fertilization operations in which present methods of application are not efficient and economical.

Another important object of the invention is to provide a method of supplying fixed nitrogen to the soil wherein liquid anhydrous ammonia may be mixed directly with water immediately prior to the application of the resultant solution of water in ammonia to the soil.

Another object, ancillary to the preceding object, is the production of a solution of ammonia in water under conditions wherein more than 28% by weight ammonia may be absorbed in solution.

Another important object of the invention is to provide an apparatus for the production of aqua ammonia directly from liquid anhydrous ammonia or to produce a dispersal of water in liquid anhydrous ammonia and to immediately apply the liquid produced to the soil.

Yet another important object of the invention is to provide a nitrogen fertilizing apparatus that may selectively supply either aqua ammonia or liquid anhydrous ammonia to the soil.

These, together with various ancillary objects and features, which will later become apparent as the following description proceeds, are attained by this invention.

The apparatus forming a part of the invention is illustrated in the accompanying drawings, wherein.

Figure 1:
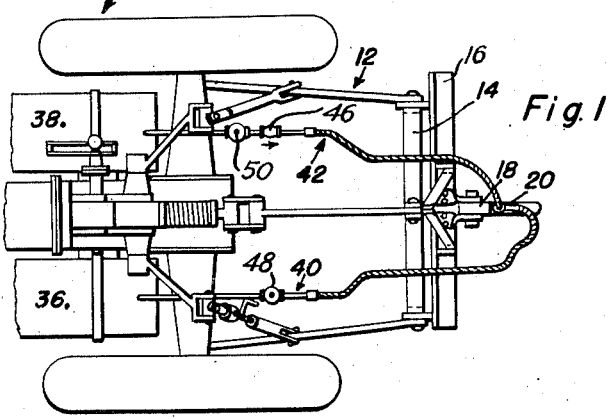
Figure 1 is a top elevational view of a tractor to which the apparatus is attached.

In Figure 1 is shown the rear end of a tractor 10 having a suitable lift assembly 12 to which is attached a draw bar 14.

Detachably secured to the draw bar bracket 16 by any suitable means 18 is the apparatus 20 constituting the ammonia applicator. The apparatus consists of an inner tube or pipe 22 and an outer tube or pipe 24 concentrically surrounding the lower portion of the inner tube.

The outer tube 24 is provided with an inlet 26 adjacent the upper end thereof and an inwardly extending top rim or annular shoulder 28 which is welded to the wall of the inner tube 22. Thus, in effect, the outer tube 24 serves as a shield or sheath for the lower portion of the inner tube 22. The bottom of the outer tube 24 is open and constitutes a discharge orifice 29 for the apparatus.

The lower portion of the inner tube 22 terminates within the outer tube 24 adjacent the discharge orifice 29 and has a closed bottom 30. The wall of the inner tube 22 disposed within the outer tube 24 is provided with a plurality of openings or perforations 32 which open into the annular space between the tubes.

Secured to the outer tube 24 in any suitable manner is a cultivator foot 34 having a curved lower end. The lower ends of the tubes 22 and 24 are correspondingly curved and follow the foot 34 as the same plows a furrow in the soil.

Mounted on the tractor 10 are a water container 36 and a cylinder of liquified anhydrous ammonia 38. Conduit 40 conduts water from the container 36 to the water inlet 26 and conduit 42 conducts the ammonia to the inner tube 22.

Figure 2:
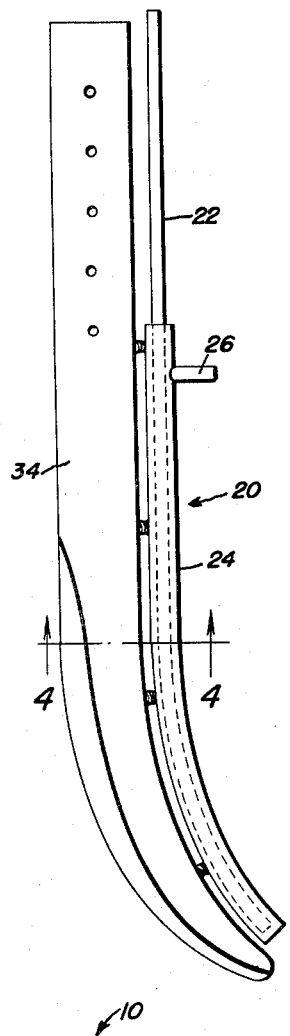
Figure 2 is an enlarged side elevational view of the apparatus.
Figure 3:
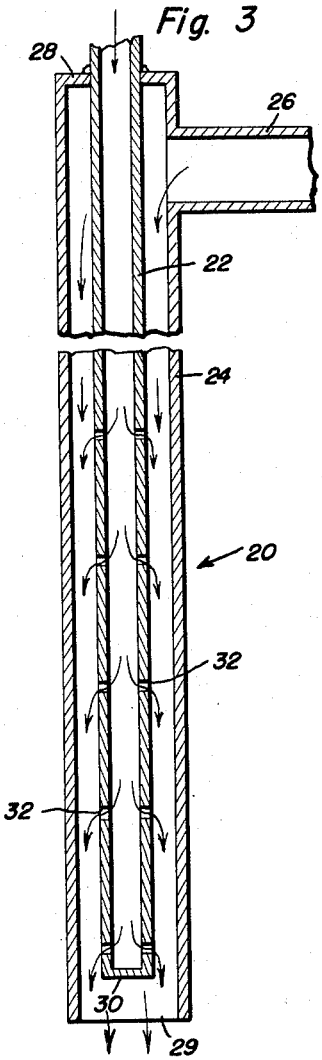
Figure 3 is an enlarged side elevational view in section of the apparatus.
Figure 5:
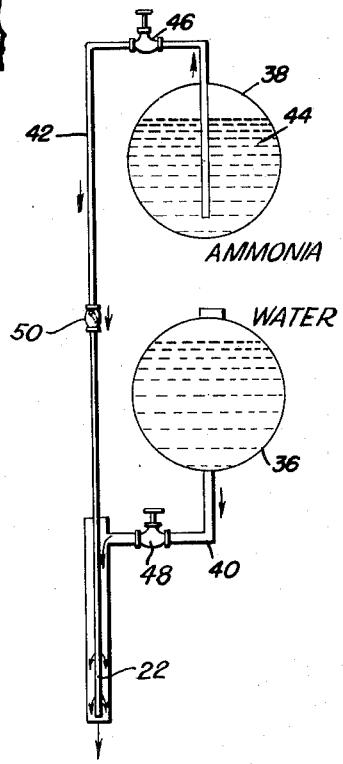
Figure 5 is a flow diagram of the apparatus and the connections to the fluid reservoirs.
Figure 4:
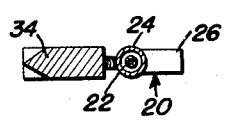
Figure 4 is a top cross-sectional view of the apparatus taken substantially along section line 4—4 of Figure 2.

Referring now to Figure 5, the flow of liquid anhydrous ammonia and water to the discharge orifice may be readily observed. The ammonia 44 passes from the cylinder 38 through the conduit 24 into the inner tube 22. To control the pressure of the ammonia escaping from the cylinder, a valve 46 is provided in the conduit 42; a suitable gauge (not shown) is also provided to register the pressure at which the ammonia is released. The anhydrous ammonia released from the cylinder passes through the perforations 32 and may thence be discharged directly into the soil through discharge orifice 29.

Also, as anhydrous ammonia is released from the cylinder, water may be simultaneously pumped from the container 36, through the conduit 40 and water inlet 26 to the annular space between the outer and inner tubes blanketing the inner tube. When this occurs a resultant solution of aqua ammonia or water in ammonia is formed within the annular space between the tubes and is discharged into the soil. Valve 48 on the conduit 40 controls the flow of water to the outer tube 24. For safety, a check valve 50 is mounted on the conduit 42.

By the above arrangement, a single apparatus is provided for discharging either liquid anhydrous ammonia or aqua ammonia into the soil. Further, with this apparatus, a continuous process for producing aqua ammonia is provided.

In deep soil applications of fixed nitrogen, from 6 to 10 inches, the apparatus may discharge liquid anhydrous ammonia directly into the soil. This application is desirable in fertilization for crops such as sugar cane and the like.

In shallow applications of fixed nitrogen, for field crops such as grass lands and rice, the anhydrous ammonia may be mixed with water as the streams of liquid ammonia and water are simultaneously directed toward the soil. The water in the outer tube blankets the ammonia flow from the inner tube and prevents it from escaping into the atmosphere.

Vaporization of liquid anhydrous ammonia is accompanied by a sharp drop in the surrounding temperature. Dissolution of ammonia in water entails a rise of temperature. Thus, in the apparatus described above, the temperature changes balance one another and prevent both the freezing of condensates on the applicator tube or mixing device and the objectionable accumulation of heat usually present in the production of aqua ammonia.

Since the solubility of ammonia in water increases with an increase in pressure and a decrease in temperature, the amount of fixed nitrogen in the described process for providing aqua ammonia may be greatly varied from 25% by weight to 81% by weight of solution by varying the releasing pressure of the anhydrous ammonia and/or the temperature of the water and/or by varying the ratio of the weights of the water and ammonia being discharged from the applicator. Since the percent of ammonia by weight in a solution of aqua ammonia at standard conditions is 28%, it is thus possible to produce supersaturated solutions of aqua ammonia under the ambient conditions of the soil to which they are applied.

Therefore, it is possible to saturate the soil with a supersaturated solution of ammonia without danger of burning the sod. The degree of supersaturation must, of course, be limited to that which will not release more free ammonia than the soil will readily absorb.

Finally, the purpose of using water with liquid ammonia is to prevent the escape of free ammonia from the soil in shallow fertilization applications. With the apparatus of the instant invention, the ammonia and water may be mixed so that the maximum quantity of ammonia may be added to the soil with the amount of water being limited to that which is just sufficient to prevent the escape of free ammonia as the liquid ammonia is discharged into the soil and the advantages of fixed nitrogen fertilization obtained by the use of anhydrous ammonia are extended to fertilization operations in which the use of anhydrous ammonia in the conventional manner would seriously damage the vegetation, soil or crop, or in which the dryness of the soil would prevent direct application of anhydrous ammonia.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A method of fixed nitrogen fertilization of soil which consists in discharging ammonia in the midst of an annular blanketing stream of water in a stream moved over the soil, said blanketing stream surrounding the ammonia with sufficient water to prevent the escape of vaporized ammonia.

2. A method as claimed in claim 1 wherein part of the ammonia stream, discharged in the midst of the annular blanketing stream of water, is directed into the blanketing stream, so that the ammonia impinges upon and mixes with the inner portion of the annular blanketing stream, thus producing a mixture of ammonia and water while the streams are both discharged.

3. The method of supplying nitrogen to the soil which consists in discharging in the midst of an annular downwardly directed stream of water, moved over the soil, a liquid anhydrous ammonia under pressure, in a direction inclined towards the direction of flow of the annular stream of water, said last named annular stream carrying sufficient water to prevent escaping of vaporized ammonia during the discharge into the soil.

4. In the method as claimed in claim 3, selecting the temperatures of the two streams so that the mixing of liquid ammonia with water occurs at a temperature lower than the temperature of the ambient air.

5. The method of fixed nitrogen fertilization of soil which consists in directing a central stream of liquid anhydrous ammonia under pressure into a surrounding annular blanketing stream of water discharged towards the soil, while said streams are moving over the soil, the stream of liquid ammonia being discharged into the blanketing stream just prior to the application of the mixture of the soil, and the amount of water mixed with liquid anhydrous ammonia being limited to that required to limit the amount of free ammonia release to the atmosphere to less than 85 parts per million parts of air by volume, said amount of water varying with the condition and moisture content of the soil and the depth of application of the liquid.

6. The method of continuously discharging a supersaturated solution of ammonia into the soil which consists in continuously moving a downwardly directed blanketing stream of water over the soil to be treated, in discharging a stream of anhydrous ammonia under pressure in the center of the blanketing stream which surrounds the anhydrous ammonia stream, the latter mixing, upon contact with the surrounding and blanketing stream, with the water, thus preventing the escape of free ammonia, and regulating the quantity of ammonia thus discharged to produce a stream of supersaturated solution of ammonia during the discharge.

7. The method as claimed in claim 6 wherein the ammonia is discharged into the blanketing stream by means of a number of streamlets the direction of which at the point of discharge into the blanketing stream is inclined towards the direction of the said blanketing stream, the streamlets thus mixing with the blanketing stream being discharged into and mixed with a sufficient quantity of water to prevent the escape of evaporated ammonia during the discharge.

8. The method of adding nitrogen to the soil for shal- fertilization without burning the sod which consists in directing a stream of liquid anhydrous ammonia towards a surrounding annular blanketing stream of water directed towards the soil and moved over the soil, in varying the pressure with which the blanketing stream is applied in accordance with the moisture content of the soil and in varying the pressure under which both streams are applied so as to produce a solution of aqua ammonia containing from 25% to 81% of fixed nitrogen by weight.

9. The method of adding nitrogen to the soil which consists in discharging an annular blanketing stream of water, directing it towards the soil while moving the said stream over the soil, in discharging a stream of anhydrous ammonia in the central portion of said blanketing stream directing the same towards the soil and also directing the same towards the surrounding blanketing stream to form a solution of aqua ammonia during the discharge said mixture streaming downwardly towards the soil while surrounded by a blanketing stream, and in adjusting the pressure and temperature of the two streams so as to produce a solution containing from 25% to 81% of available nitrogen.

References Cited in the file of this patent

UNITED STATES PATENTS

| | | |
|---|---|---|
| 1,173,534 | Ryan | Feb. 29, 1916 |
| 1,667,923 | Bishop | May 1, 1928 |
| 1,777,391 | Brewer | Oct. 7, 1930 |
| 1,810,131 | Daily | June 16, 1931 |
| 2,020,824 | De Bruyn | Nov. 12, 1935 |
| 2,029,017 | Cooney | Jan. 28, 1936 |
| 2,038,316 | Rosenstein | Apr. 21, 1936 |
| 2,206,089 | Gray | July 2, 1940 |
| 2,210,846 | Aghnides | Aug. 6, 1940 |
| 2,323,773 | Irish | July 6, 1943 |
| 2,335,250 | Adlam | Nov. 30, 1943 |
| 2,336,522 | Aiman | Dec. 14, 1943 |
| 2,415,251 | Leavitt | Feb. 4, 1947 |
| 2,424,520 | Tonkin | July 22, 1947 |
| 2,455,498 | Kern | Dec. 7, 1948 |
| 2,598,121 | Hannibal | May 27, 1952 |

OTHER REFERENCES

Agricultural Engineering, September 1947, pages 394–396, "Machinery for Applying Anhydrous Ammonia To The Soil," by F. E. Edwards et al.